United States Patent
Bing

(10) Patent No.: US 6,580,029 B1
(45) Date of Patent: Jun. 17, 2003

(54) ELECTRICAL AND TELECOMMUNICATIONS CONDUIT BODIES

(76) Inventor: Kenneth G. Bing, 132 Lincoln Ave., Zeeland, MI (US) 49464

( * ) Notice: Subject to any disclaimer, the term of this patent is extended or adjusted under 35 U.S.C. 154(b) by 0 days.

(21) Appl. No.: 09/572,473

(22) Filed: May 17, 2000

(51) Int. Cl.[7] .................................................. H02G 3/04
(52) U.S. Cl. ............................ 174/48; 174/49; 174/24; 174/60; 439/456
(58) Field of Search ........................ 174/48, 50, 17 CT, 174/49, 21 R, 24, 65 R, 50.51, 68.1, 68.3, 135, 60; 220/3.2, 3.8, 378; 439/582, 610, 456; 248/300

(56) References Cited

U.S. PATENT DOCUMENTS

| | | | |
|---|---|---|---|
| 4,801,118 A | * | 1/1989 | Wium .......................... 248/300 |
| RE35,075 E | * | 10/1995 | Lammens, Jr. ................ 220/3.2 |
| 5,621,189 A | * | 4/1997 | Dodds ............................ 174/50 |
| 5,704,400 A | * | 1/1998 | Eldridge |
| 6,049,040 A | * | 4/2000 | Biles et al. ................. 174/68.3 |
| 6,225,557 B1 | * | 5/2001 | Fonteneau et al. ............. 174/50 |

FOREIGN PATENT DOCUMENTS

GB          2 254 966       * 10/1992  ................... 174/48

* cited by examiner

Primary Examiner—Dean A. Reichard
Assistant Examiner—Dhiru R Patel
(74) Attorney, Agent, or Firm—Price, Heneveld, Cooper, DeWitt & Litton

(57) ABSTRACT

An electrical and telecommunications conduit body for connecting electrical conduits. The conduit body includes a body defining a chamber and hubs defining passageways communicating with the chamber. The conduit body includes a guide surface disposed between the chamber ends of the hub passageways, and the guide surfaces function to maintain a minimum radius of curvature of cables passing through the passageway defined by one hub and then through the chamber defined by the body to the other hub passageway so as to avoid pulling the cables over sharp corners at the intersections of the hub passageways with the body chamber.

19 Claims, 6 Drawing Sheets

ELECTRICAL AND TELECOMMUNICATIONS CONDUIT BODIES

BRIEF SUMMARY OF THE INVENTION

This invention relates to electrical conduit bodies and, more particularly, to improved electrical conduit bodies such as, for example, LB and TEE bodies particularly adapted for use with Category 5, 5E and 6 telecommunication cables as well as with optical fiber data cabling systems, it being understood that the present invention is also applicable to other uses.

As is well known in the art, many building codes require electrical wiring to be enclosed in electrical conduits which conduits may be connected to each other through the agency of electrical conduit bodies. Typical electrical conduit bodies are marketed, for example, by Cooper Industries, Inc. of Houston, Tex. in conjunction with the trademark "CONDULET".

Typical prior electrical conduit bodies have a generally oblong body provided with integral longitudinal walls and end walls and a side wall, such walls defining a chamber open on one side of the body. A removable cover may be provided for closing the open side of the body. The body is also provided with spaced conduit connecting hubs each defining a passageway communicating with the chamber defined by the body. Prior conduit bodies are designed, for example, for wire pulls, such as angled wire pulls and Y wire pulls. However, data transmission performance of Category 5, 5E and 6 telecommunication cables as well as optical fiber data cabling systems can be seriously degraded if they are bent with less than a predetermined minimum bend radius, as for example with less than a minimum one inch bend radius, and no provision is made in prior conduit bodies of the indicated character for providing a smooth transition while pulling cables from the electrical conduit through the conduit bodies while maintaining a predetermined minimum bend radius for the telecommunication cables. Thus, the pulling of Category 5, 5E and 6 telecommunication cables as well as optical fiber data cabling systems through the prior conduit bodies can result in damaging such cabling when it is pulled over the relatively sharp corners encountered in the prior electrical conduit bodies of the indicated character.

An object of the present invention is to overcome disadvantages in prior electrical conduit bodies of the indicated character and to provide an improved conduit body which facilitates pulling cables therethrough without pulling the cables over relatively sharp corners and without damaging the cables' performance integrity.

Another object of the present invention is to provide an improved conduit body particularly adapted for use in Category 5, 5E, 6 and optical fiber data cabling systems which conduit bodies may be retro-fitted or which may be provided as a new unit.

Another object of the present invention is to provide an improved conduit body adapted to maintain a minimum cable bend radius which protects the cables and prevents the cables from exceeding their minimum bend radius as recommended by recognized telecommunication industry standards.

Another object of the present invention is to provide an improved conduit body which effects a smooth transition while cables are pulled from one conduit through the conduit body to another conduit while maintaining specified minimum bend radii for the cables.

Another object of the present invention is to provide improved electrical and telecommunications conduit bodies which are TIA/EIA569 compliant.

Another object of the present invention is to provide an improved conduit body which prevents cables passing therethrough from exceeding their minimum bend radius as recommended by TIA/EIA569.

Another object of the present invention is to provide an improved electrical conduit body incorporating improved means for effecting the pulling of cables from one conduit to another conduit while maintaining the proper minimum bend radius for the cables.

Another object of the present invention is to provide an improved conduit body that is economical to manufacture and assemble, durable, efficient and reliable in operation.

The above as well as other objects and advantages of the present invention will become apparent from the following description, the appended claims and the accompanying drawings.

DETAILED DESCRIPTION

Figure 1:
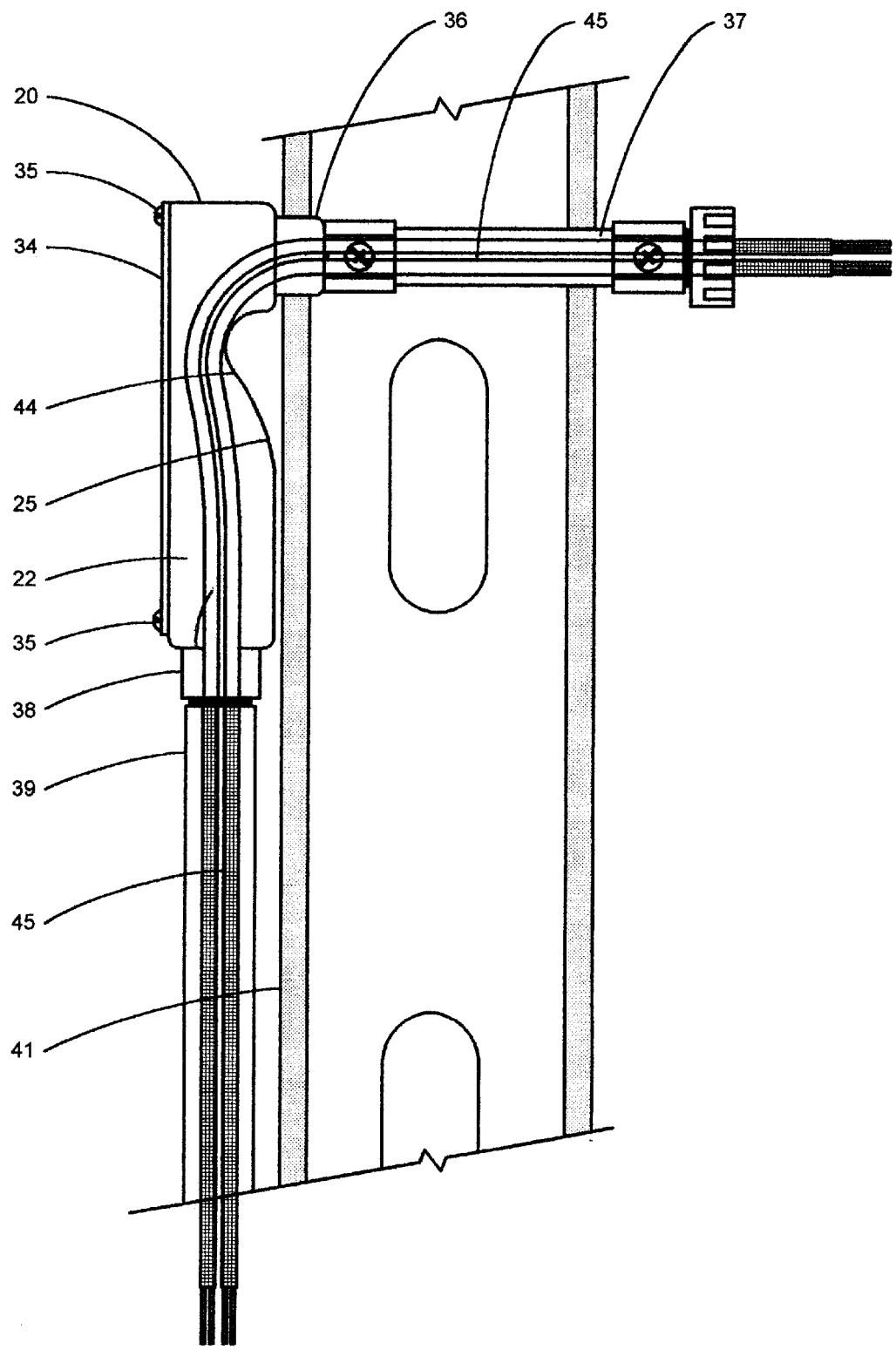
FIG. 1 is a schematic cross sectional elevational view of an electrical and telecommunications conduit body embodying the present invention, showing the same installed on a wall of a building.
Figure 2:
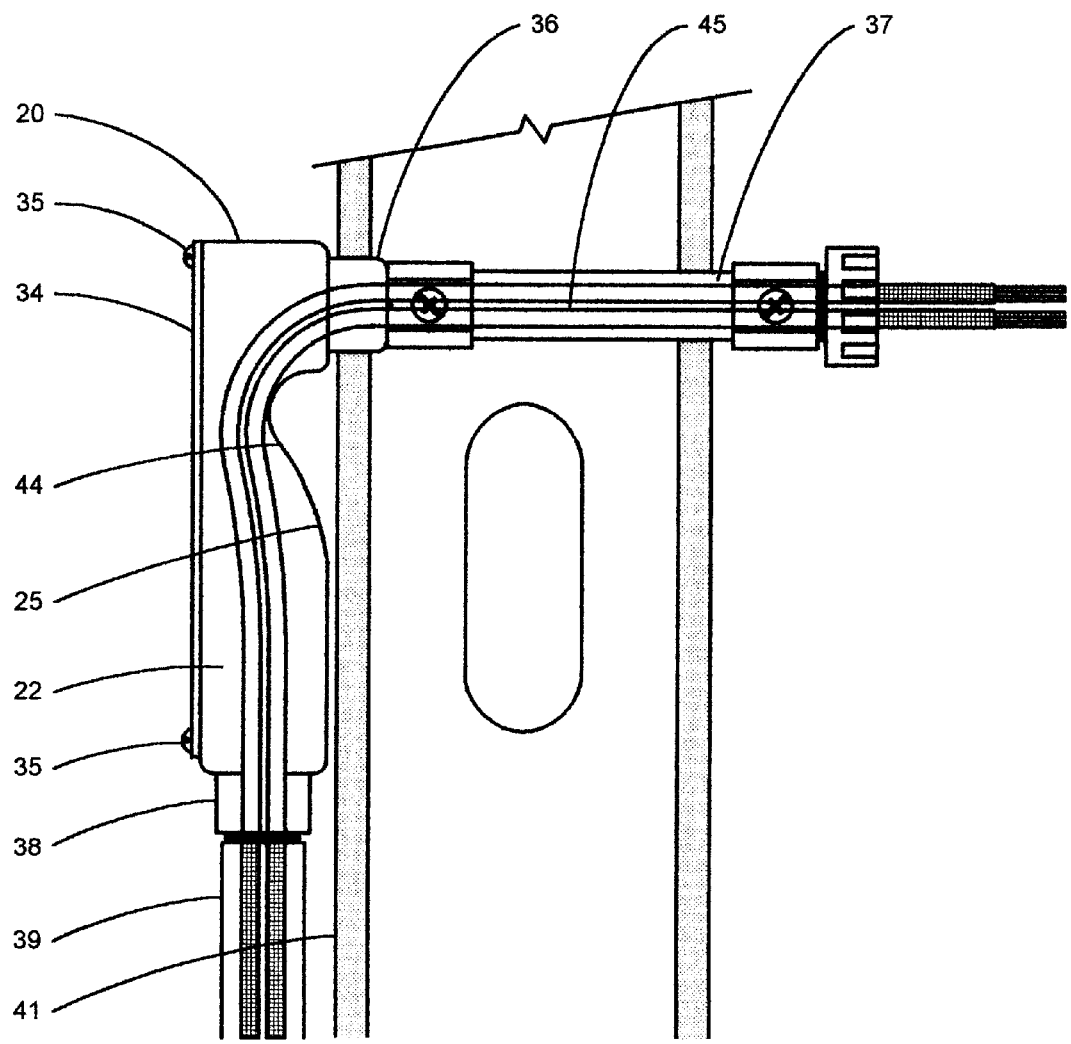
FIG. 2 is an enlarged cross sectional view of a portion of the structure illustrated in FIG. 1.

Referring to the drawings, and more particularly to FIGS. 1, 2, 6 and 7 thereof, the present invention is shown embodied in an electrical and telecommunications conduit body, generally designated 20, particularly adapted for use in Category 5, 5E, 6 and optical fiber data cabling systems. The conduit body 20 has a generally oblong body 22 provided with integral longitudinal walls 24 and 26, a side wall 25, and end walls 28 and 30, defining a chamber 32 open on one side of the body 22. A removable cover 34 may be provided, secured as by screws 35, for closing the open side of the body. The body 22 is also provided with spaced conduit connecting hubs 36 and 38 defining passageways 40 and 42, respectively, communicating with the chamber 32 defined by the body 22. In this embodiment of the invention the longitudinal axes of the passageways 40 and 42 intersect at substantially right angles. It should be understood that the connecting hubs may be provided on the body at any desired locations, and the connecting hubs are threaded for connection to conventional electrical conduits, such as 37 and 39, which carry the cables to and from the wall 41. In accordance with the present invention, means is provided for maintaining minimum cable bend radii as the cables pass through the conduit body. In the embodiment of the invention illustrated in FIGS. 1, 2, 6 and 7, an integral guide portion 44 is provided in the side wall 25 of the conduit body. As shown in the drawings, the guide portion 44 extends from adjacent the connecting hub 38 at the lower end of the body, as illustrated in FIGS. 1 and 2, through the interior of the conduit body chamber 32 to the hub portion 36 at the upper end of the conduit body whereby a minimum bending radius is maintained as the communication cables, such as 45, pass through the conduit body as illustrated in FIGS. 1 and 2. Such a construction facilitates pulling the cables through the conduit body without damaging the cables and avoids pulling the cables over sharp corners. As previously mentioned, data transmission performance of Category 5, 5E, 6 and optical fibers can be degraded if they are bent less than a predetermined bend radius, and the present invention obviates such a condition. The guide portion 44 of the wall 25 maintains a minimum cable bend radius, as for example one inch, which protects the cables and prevents the cables from exceeding their minimum bend radius as recommended by recognized industry standards (BICSI). The guide portion 44 of the wall 25 thus effects a smooth transition for bringing cables from one conduit to another conduit while maintaining the proper minimum bend radius for the cables.

Conduit bodies embodying the present invention may be manufactured from cast aluminum, cast iron, PVC, or other materials having sufficient strength to withstand the forces exerted thereon.

Figure 3:
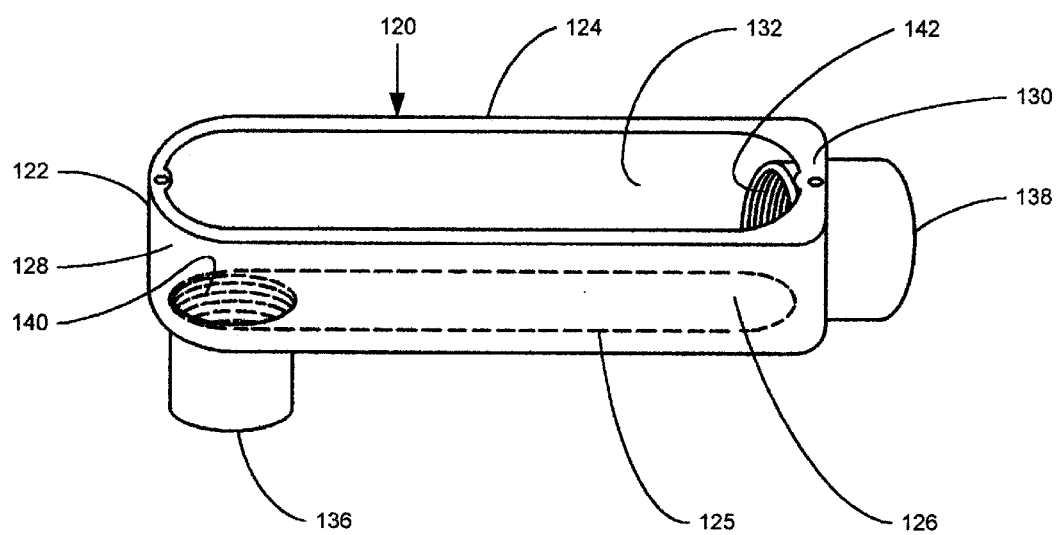
FIG. 3 is a perspective view of a prior art electrical conduit body of the type marketed in conjunction with the trademark "CONDULET"
Figure 4:
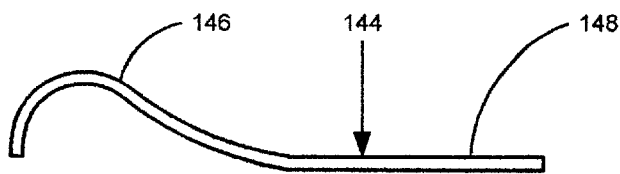
FIG. 4 is a side elevational view of a retro-fit unit which may be installed in a prior art unit of the type illustrated in FIG. 3 so as to embody the present invention.
Figure 5:
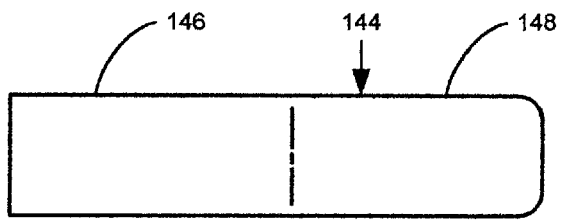
FIG. 5 is a top view of the structure illustrated in FIG. 4.
Figure 6:
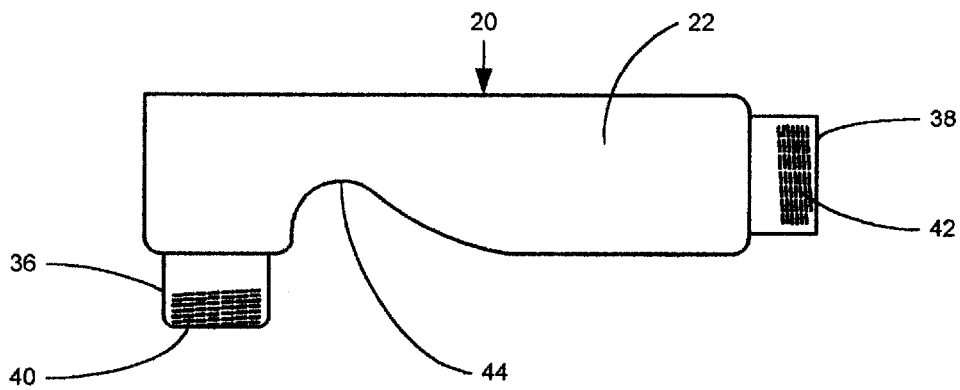
FIG. 6 is a schematic side elevational view similar to FIG. 2, illustrating a conduit body embodying the present invention, and showing the same with the cables removed therefrom.
Figure 7:
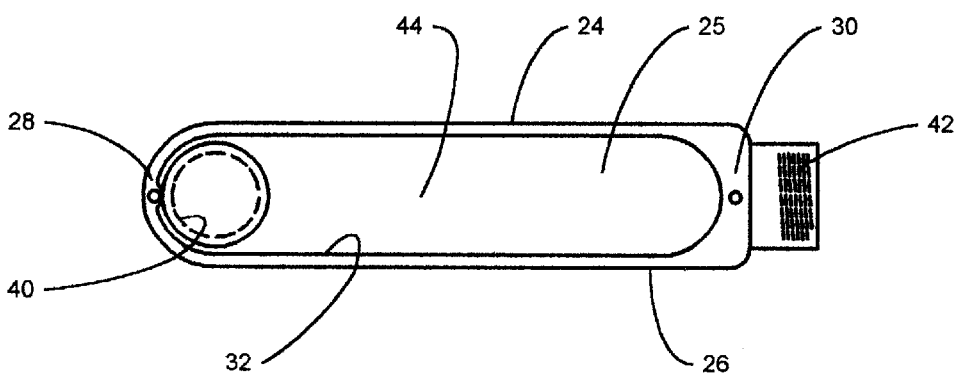
FIG. 7 is a top view of the structure illustrated in FIG. 6.

Another embodiment of the invention is illustrated in FIGS. 4 and 5. This embodiment of the invention is particularly adapted for use in retro-fitting prior art conduit bodies of the type illustrated in FIG. 3. Referring to FIG. 3 of the drawings, a prior art conduit body, generally designated 120, is depicted therein. The conduit body 120 has a generally oblong body 122 provided with integral longitudinal walls 124 and 126, a flat side wall 125, and end walls 128 and 130 defining a chamber 132 open on one side of the body 122. A removable cover (not shown) may be provided which may be secured to the body through the agency of screws (not shown) to close the open side of the body. The body 122 is also provided with spaced conduit connecting hubs 136 and 138 defining passageways 140 and 142, respectively, communicating with the chamber 132 defined by the body 122. This embodiment of the invention provides a guide member 144 which may be inserted in conduit bodies of the type illustrated in FIG. 3 to facilitate maintaining a minimum cable bend radius which prevents cables passing through the conduit body from exceeding their minimum bend radius as recommended by recognized telecommunications industry standards (BICSI). The guide member 144 includes a curved portion 146 which functions to maintain minimum cable bend radii to prevent the cables from exceeding their minimum bend radii and effects a smooth transition for bringing cables from one conduit to another conduit through the prior art body of the type illustrated in FIG. 3. The guide member 144 also includes a flat portion 148 which is disposed adjacent the side wall 125 of the body and which extends from the curved portion 146 to the hub 138 to prevent the guide member from moving longitudinally of the chamber as cables are pulled through the chamber.

Figure 8:
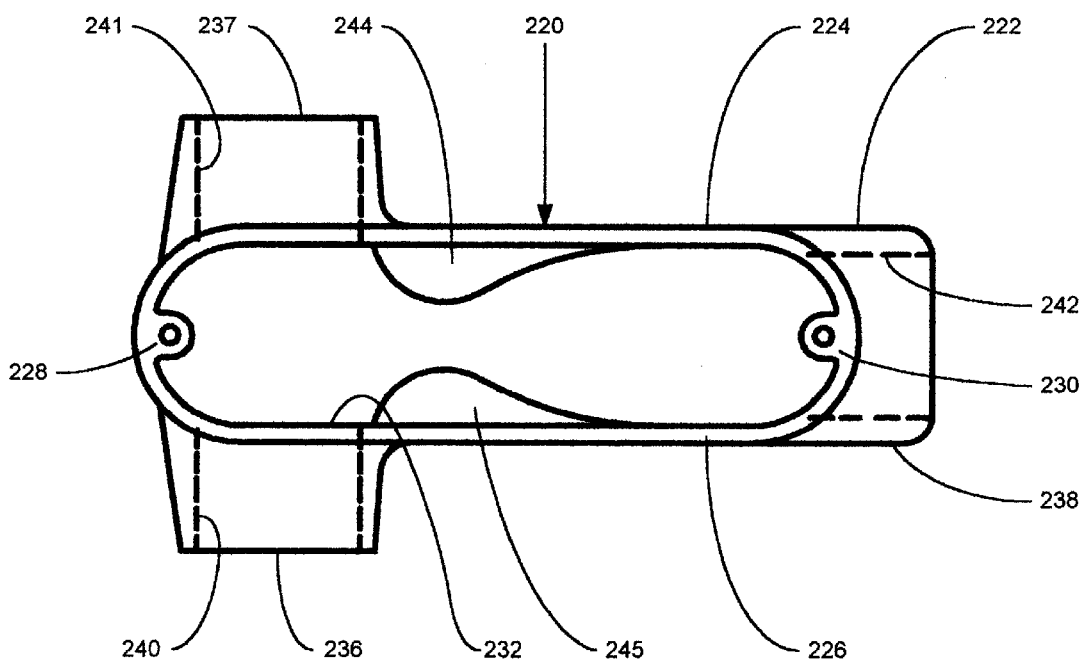
FIG. 8 is a schematic elevational view of another embodiment of the invention.
Figure 9:
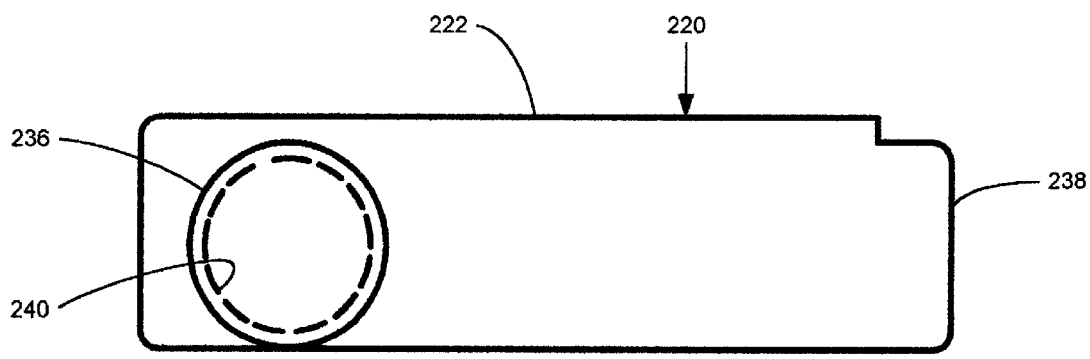
FIG. 9 is a top view of the schematic structure illustrated in FIG. 8.

FIGS. 8, 9, 10 and 11 schematically illustrate other types of conduit body configurations which may embody the present invention. FIGS. 8 and 9 illustrate a conduit body having three conduit connecting hubs with an integral guide member which prevents cables passing from the hub through the conduit body to the hub at the other end of the conduit body from exceeding their minimum bend radius as recommended by recognized telecommunications industry standards (BICSI). Referring more particularly to FIGS. 8 and 9 of the drawings, a conduit body, generally designated 220, is depicted therein. The conduit body 220 has a generally oblong body 222 provided with integral longitudinal walls 224 and 226, a flat side wall 225 and end walls 228 and 230 defining a chamber 232 open on one side of the body 222. This embodiment of the invention may also be provided with a removable cover (not shown) which may be secured to the body through the agency of screws (not shown) to close the open side of the body. In this embodiment of the invention the body 222 is provided with spaced conduit connecting hubs 236, 237 and 238 defining passageways 240, 241 and 242 communicating with the chamber 232 defined by the body 222. In this embodiment of the invention, integral guide portions 244 and 245 are provided on the longitudinal walls 224 and 226 of the conduit body. As shown in FIGS. 8 and 9, the guide portions 244 and 245 extend from adjacent the connecting hubs 236 and 237, respectively, along the longitudinal walls 224 and 226 and through the interior of the body chamber 232 to the hub portion 238 whereby a minimum bending radius is maintained as the communication cables pass through the conduit body. Accordingly, such a construction facilitates pulling cables through the conduit body without damaging the cables and avoids pulling the cables over sharp corners. The guide portions 244 and 245 thus effect a smooth transition for bringing cables from one conduit to another conduit while maintaining the proper minimum bend radius for the cables.

Figure 10:
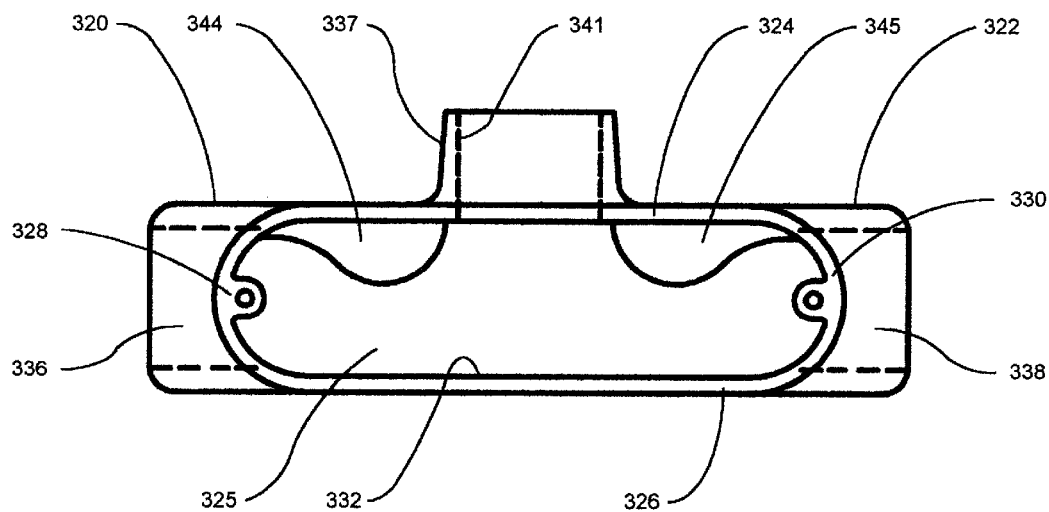
FIG. 10 is a schematic side elevational view of another embodiment of the invention.
Figure 11:
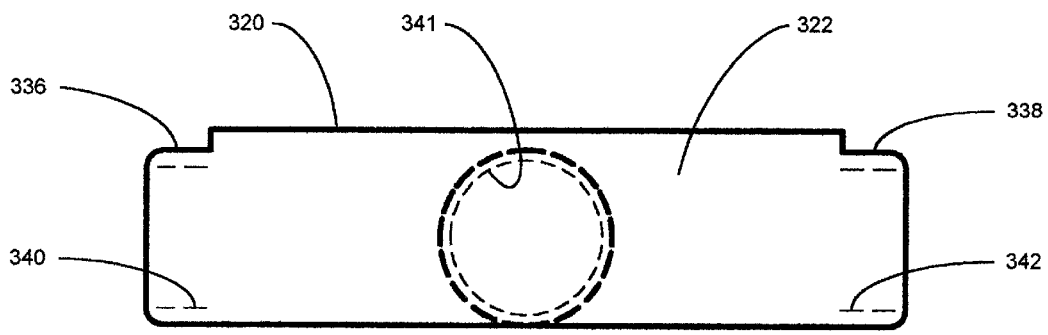
FIG. 11 is a top view of the schematic structure illustrated in FIG. 10.

FIGS. 10 and 11 illustrate a conduit body having three right angle conduit connecting hubs and two integral guide members which facilitate pulling cables from the hub at the right end of the conduit body as viewed in FIGS. 10 and 11, through the conduit body to the hub at the top of the conduit body, as viewed in FIG. 10, and also facilitates pulling cables from the hub at the left end of the conduit body, as viewed in FIGS. 10 and 11, through the conduit body to the central connecting hub at the top of the conduit body. Referring more specifically to FIGS. 10 and 11 of the drawings, a conduit body, generally designated 320, is depicted therein. The conduit body 320 has a generally oblong body 322 provided with integral longitudinal walls 324 and 326, a flat side wall 325, and end walls 328 and 330 defining a chamber 332 open on one side of the body 322. A removable cover (not shown) may also be provided which may be secured to the body through the agency of screws (not shown) to close the open side of the body. In this embodiment of the invention, the body 322 is provided with three conduit connecting hubs 336, 337 and 338 defining passageways 340, 341 and 342 communicating with the chamber 332 defined by the body 322. In this embodiment of the invention, integral guide portions 344 and 345 are provided on the longitudinal wall 324 of the conduit body. As shown in FIGS. 10 and 11, the guide portions 344 and 345 extend in opposite directions from the adjacent connecting hub 337 at the top of the body, as viewed in FIG. 10, through the interior of the body chamber 332 to the hub portions 336 and 338 at the opposite ends of the body whereby a minimum bending radius is maintained as the communication cables pass through the conduit body from the hub portion 337 at the top of the body to either of the hub portions 336 and 338 at the opposite ends of the body. Accordingly, such a construction also facilitates pulling the cables through the conduit body without damaging the cables and avoids pulling the cables over sharp corners. The guide portions 344 and 345 on the longitudinal wall 324 thus effect a smooth transition for bringing cables from one conduit to another conduit while maintaining the proper minimum bend radius for the cables.

While preferred embodiments of the invention have been illustrated and described, it will be understood that various changes and modifications may be made without departing from the spirit of the invention.

What is claimed is:

1. An electrical and telecommunications conduit body comprising, in combination, a body having integral longitudinal walls and end walls and a side wall, said walls defining a chamber, said body having spaced hubs each defining a passageway communicating with the chamber defined by said body, and a guide surface disposed in said chamber and on said side wall adjacent one of said hub passageways for maintaining a predetermined minimum radius of curvature of a cable passing over said guide surface and facilitating pulling of said cable through said conduit body.

2. The combination as set forth in claim 1, further comprising a guide member disposed in said chamber and on said side wall and extending between the passageways defined by said hubs, said guide member including said guide surface for maintaining a predetermined radius of curvature of said cable passing over said guide surface and through the passageways defined by said hubs.

3. The combination as set forth in claim 2, wherein said guide member is sized and shaped to be received in the chamber defined by said body with a tight fit.

4. The combination as set forth in claim 1, wherein the axes of the passageways are defined by said hubs being disposed in intersecting relationship.

5. The combination as set forth in claim 1, wherein the axes of the passageways are defined by said hubs being disposed at right angles to each other.

6. The combination as set forth in claim 1, further comprising means for fastening said hubs to electrical conduits.

7. The combination as set forth in claim 1, wherein said body is generally oblong in configuration.

8. The combination of claim 1, wherein said guide surface is integral with said side wall of said body.

9. The combination of claim 1, wherein said guide surface is provided on a guide member inserted into said conduit body and disposed on said side wall.

10. An electrical and telecommunications conduit body comprising, in combination, a body having integral spaced longitudinal walls and spaced end walls and a side wall, said walls defining a chamber open on one side of said body, a removable cover for closing said open side of said body, said body having integral spaced hubs each defining a passageway communicating with the chamber defined by said body, and a curved guide surface disposed in said chamber and on said side wall adjacent at least one of said hub passageways for maintaining a predetermined minimum radius of curvature of a cable passing over said guide surface and facilitating pulling of said cable through the conduit body.

11. The combination as set forth in claim 10, wherein said guide surface is defined by said side wall of said body.

12. The combination as set forth in claim 10, further comprising a guide member disposed in said chamber and on said side wall and extending between the chamber ends of the passageways defined by said hubs, said guide member including said curved guide surface for maintaining a predetermined radius of curvature of said cable passing over said guide surface and through the passageways defined by said hubs.

13. The combination as set forth in claim 12, wherein said guide member is sized and shaped to be received in the chamber defined by said body with a tight fit.

14. The combination as set forth in claim 10, wherein the axes of at least two of the passageways defined by said hubs are disposed in intersecting relationship.

15. The combination as set forth in claim 10, wherein the axes of the passageways are defined by said hubs being disposed at right angles to each other.

16. The combination as set forth in claim 10, further comprising means for fastening said hubs to electrical conduits.

17. The combination as set forth in claim 10, wherein said body is generally oblong in configuration.

18. The combination of claim 10, wherein said guide surface is integral with side wall of said body.

19. The combination of claim 10, wherein said guide surface is provided on a guide member inserted into said conduit body and disposed on said side wall.

\* \* \* \* \*